United States Patent
Reinschke

(10) Patent No.: US 8,125,166 B2
(45) Date of Patent: Feb. 28, 2012

(54) METHOD FOR THE PREDICTIVE CLOSED-LOOP CONTROL OF A LINEAR DRIVE OR OF A LINEAR COMPRESSOR AND LINEAR DRIVE OR LINEAR COMPRESSOR SUBJECT TO PREDICTIVE CLOSED-LOOP CONTROL

(75) Inventor: Johannes Reinschke, Nürnberg (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 664 days.

(21) Appl. No.: 12/224,513

(22) PCT Filed: Jan. 11, 2007

(86) PCT No.: PCT/EP2007/050230
§ 371 (c)(1),
(2), (4) Date: Dec. 8, 2008

(87) PCT Pub. No.: WO2007/098973
PCT Pub. Date: Sep. 7, 2007

(65) Prior Publication Data
US 2010/0047079 A1      Feb. 25, 2010

(30) Foreign Application Priority Data
Feb. 28, 2006   (DE) .................... 10 2006 009 259

(51) Int. Cl.
*H02P 1/00* (2006.01)
(52) U.S. Cl. ......... 318/135; 318/132; 318/133; 318/134
(58) Field of Classification Search .................. 318/135, 318/132, 133, 134
See application file for complete search history.

(56) References Cited

U.S. PATENT DOCUMENTS

| | | | |
|---|---|---|---|
| 3,886,419 A | | 5/1975 | Omura et al. |
| 5,557,154 A | * | 9/1996 | Erhart .............................. 310/80 |
| 5,897,296 A | * | 4/1999 | Yamamoto et al. .......... 417/44.1 |
| 5,980,211 A | | 11/1999 | Tojo et al. |
| 6,663,348 B2 | * | 12/2003 | Schwarz et al. ................ 417/12 |
| 6,753,665 B2 | * | 6/2004 | Ueda et al. .................... 318/135 |
| 2003/0021693 A1 | | 1/2003 | Schwarz et al. |
| 2005/0231706 A1 | | 10/2005 | Yang et al. |

FOREIGN PATENT DOCUMENTS

| | | |
|---|---|---|
| JP | 10-127078 | 5/1998 |
| WO | WO 01/48379 | 7/2001 |
| WO | WO 01/71186 | 9/2001 |
| WO | WO 03/081040 | 10/2003 |

OTHER PUBLICATIONS

International Search Report PCT/EP2007/050230.

\* cited by examiner

*Primary Examiner* — Walter Benson
*Assistant Examiner* — David Luo
(74) *Attorney, Agent, or Firm* — James E. Howard; Andre Pallapies

(57) ABSTRACT

A method for closed-loop control of a linear drive including a stator, a rotor configured for reciprocating movement along a drive axis therein, and a drive coil through which coil current flows, in particular for a linear compressor including a piston housing and a compressor piston configured for reciprocating movement along a piston axis therein, and driven by the linear drive wherein the coil current is subject to closed-loop control, the method including the steps of determining a target coil current and applying an actual coil current wherein the actual coil current and the target coil current are substantially the same value.

30 Claims, 5 Drawing Sheets

Fig. 1
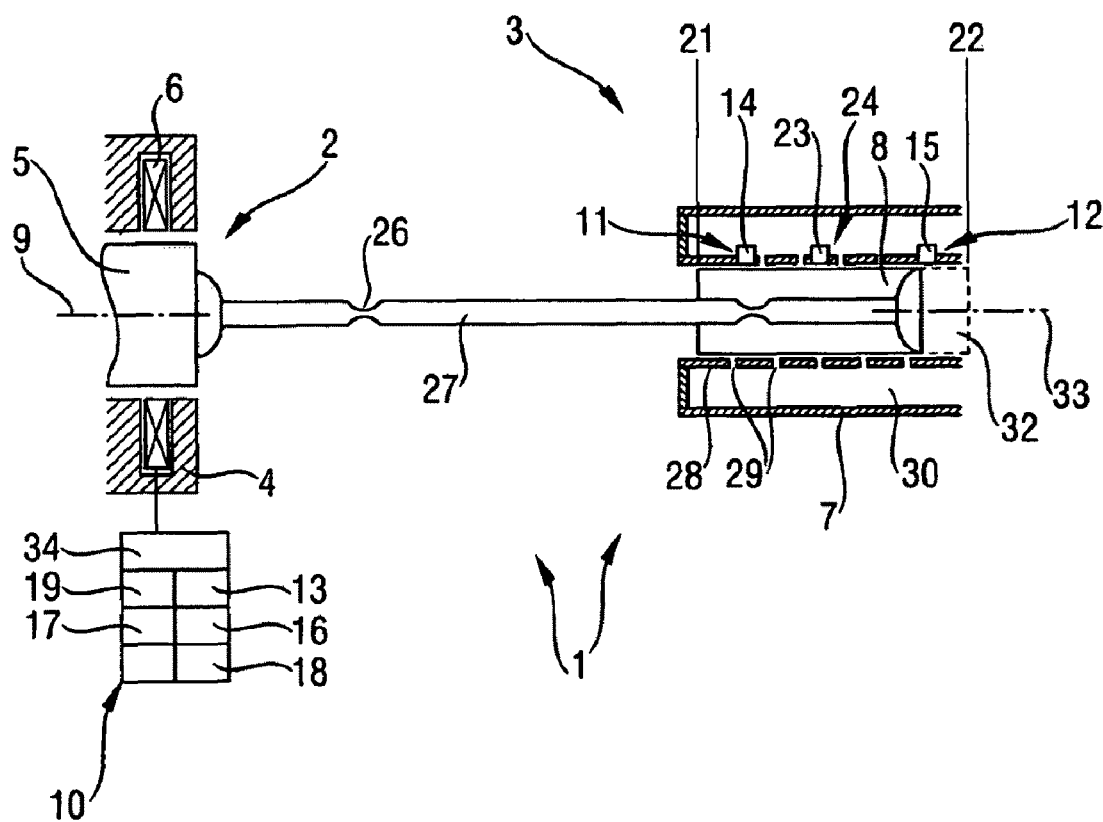
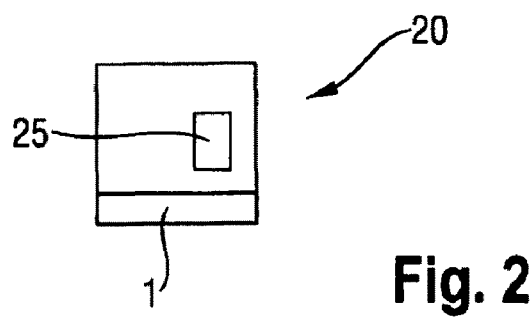
Fig. 2

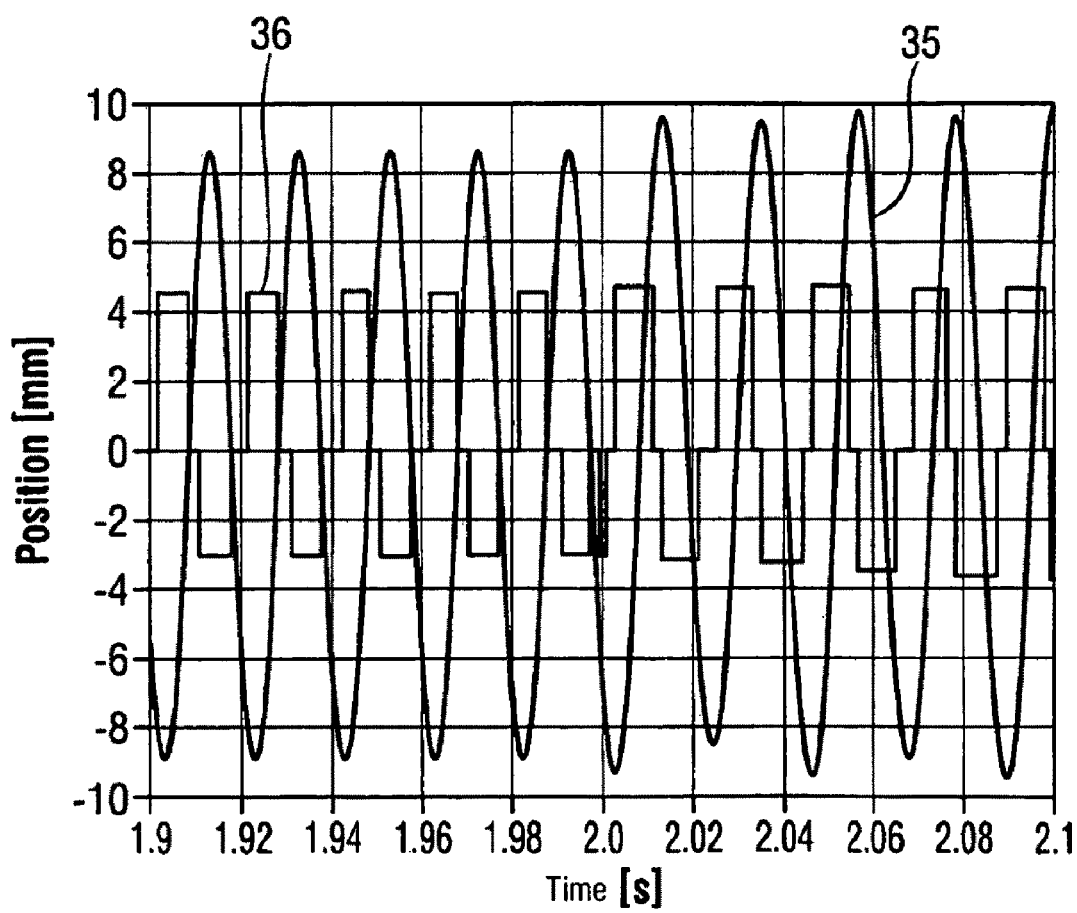

METHOD FOR THE PREDICTIVE CLOSED-LOOP CONTROL OF A LINEAR DRIVE OR OF A LINEAR COMPRESSOR AND LINEAR DRIVE OR LINEAR COMPRESSOR SUBJECT TO PREDICTIVE CLOSED-LOOP CONTROL

BACKGROUND OF THE INVENTION

The invention relates to a method for the control of a linear drive which has a stator, a rotor which is capable of moving to and fro along a driving axis therein and a drive coil through which a coil current flows, in particular for a linear compressor which has a piston housing and a compressor piston which is capable of moving to and fro along a piston axis therein and is driven by a linear drive, as well as a device comprising a linear drive which has a stator, a rotor which is capable of moving to and fro along a drive axis therein, a drive coil through which a coil current flows and a means for the control of a coil current, in particular for a linear compressor which has the linear drive, a piston housing and a compressor piston which is capable of moving to and fro along a piston axis and can be driven by the linear drive, as well as a method for cooling goods and/or for compressing a fluid.

In a linear compressor, the compressor piston which is capable of moving to and fro along an axis between a first and a second reversal point must be mounted or guided in a direction perpendicular to said axis. Moreover, the kinetic energy of the compressor piston which moves to and fro must be intermediately buffered at the reversal points, i.e. at the points at which the direction of movement of the compressor piston reverses, in order to allow the direction of movement of the compressor piston to be reversed with as little loss as possible. By reversing the direction of movement, the compressor piston implements an oscillating, essentially translational to-and-fro movement in a piston housing. With the help of the to-and-fro movement, a compression process is carried out.

When guiding the oscillating compressor piston, the aim, in order to achieve as high a degree of efficiency of the compressor as possible, is to bring the compressor piston as near as possible to a valve plate of the piston housing in order thus to keep a dead volume formed in front of the valve plate as small as possible. Here however, a collision of the compressor piston with the valve plate must be avoided since a collision of the compressor piston can lead to damage to the compressor piston or to a valve plate. Moreover, a piston rod for the power transmission between compressor piston and linear drive can break, which likewise leads to functional incompetency of the linear compressor. For this reason a safety clearance should always be maintained between the compressor piston and the valve plate.

The object is therefore to develop the armature oscillation as uniformly as possible and with as small a dead volume in front of the valve plate as possible, without the compressor piston striking the valve plate.

Known linear drives frequently require either a precise adaptation of the individual moveable mechanical components to one another, or require a temporary deceleration of the moving parts with the linear drive in order to be able to control the movement in an adequately precise fashion. Fine-tuning the compressor is complicated however, and deceleration with the linear drive reduces its degree of efficiency.

The unexamined German application DE 24 17 443 discloses connecting a coil current of the linear drive via a converter connection (H bridge) in phase with a natural armature oscillation. WO 01/48379 A1 and US 2003/0021693 A1 disclose how to measure time points at which a piston passes through a predetermined position in the vicinity of an upper reversal point. The voltage amplitude on the drive coil is adapted or controlled according to the time measurement, wherein the voltage on the drive coil is predetermined with the aid of an H-bridge. WO 01/71186 A2 and WO 03/081040 A1 describe special position sensors in linear compressors.

BRIEF SUMMARY OF THE INVENTION

It is therefore an object of the present invention to indicate a method for the control of a linear drive or a linear compressor as well as a linear drive or linear compressor comprising this linear drive itself, with which a to-and-fro movement of a rotor or a compressor piston can be efficiently controlled as precisely as possible and with as simple means as possible, wherein the degree of efficiency obtainable during the driving or compression process should be as large as possible.

The object is also to specify a particular method for cooling goods or compressing a fluid, which works operates and in an energy-saving fashion, with as high a degree of efficiency as possible.

This object is achieved according to the invention by the method for controlling a linear drive or a linear compressor, by the device comprising a linear drive or a linear compressor as well as by the method for cooling goods and/or for compressing a fluid as is indicated in the independent claims. Further advantageous embodiments and developments, each of which can be applied individually or combined in any manner with one another, are the subject matter of the respectively dependent claims.

The method according to the invention for controlling a linear drive, which includes a stator, a rotor which is capable of moving to and fro along a drive axis therein and a drive coil through which a coil current flows, in particular for a linear compressor which has a piston housing and a compressor piston which is capable of moving to and fro along a piston axis therein and is driven by the linear compressor, provides that the coil current is controlled, namely in such a way that the actual coil current and the target coil current are essentially the same.

By the use of the coil current as a control variable, network voltage fluctuations can be equalized by the current controller. External and internal voltage fluctuations therefore do not lead directly to a change in the magnetic field in the linear drive, which means very high precision can be effected when guiding the rotor or the compressor piston. A higher positioning precision is thus achieved in particular, which, in combination with a linear compressor, leads to an improved degree of efficiency as a result of a reduced dead volume for a compressible fluid. The improved movement test allows, for example, for a reduction in the safety clearance between a compressor piston and a valve plate on the linear compressor. Low-frequency parasitic drags on the armature or piston oscillation caused by deviations in the cooling circuit are very slow in comparison to an oscillation period and can be compensated by a corresponding adjustment of the current control.

With the method, transient effects can also be taken into consideration at the same time, so that the difference between the actual coil current and the target coil current also remains small in the transients roughly with the current levels.

With the method, the actual coil current is used as a control variable and compared with a target current. The result of this comparison is conveyed in the form of an error signal to a controlling element, as a result of which the actual coil current is adjusted to the target coil current. By this current control, inversely-phased driving is reliably avoided. Avoiding an inversely-phased drive rules out a deceleration of the to and fro movement through the linear drive. As a result, the movement of the linear drive is more efficient and a linear compressor using this linear drive can be operated with a higher degree of efficiency.

In one development, a target coil current is determined as a function of a momentary and/or future actual position of the rotor or the compressor piston. The actual position can be recorded both in relation to the rotor and also in relation to the compressor piston with the help of corresponding recording means.

The momentary and/or future actual position of the rotor or the compressor piston can be determined as a function of the last 2 to 20, in particular 4 to 10, oscillation periods.

For example, the to-and-fro movement of the rotor or of the compressor piston is recorded with the help of a position sensor; and the reversal positions in the direct future, i.e. the points at which the direction of movement of the rotor or the compressor piston reverses, are predicted by averaging the movement over the last 5 oscillation periods.

Alternatively, the future actual position is anticipated by allowing for a trend in the to-and-fro movement over the last 2 to 20, in particular 4 to 10, oscillation periods. In this embodiment a decrease or an increase of an oscillation amplitude or of the compressor piston is also taken into consideration, in order to determine the future actual position, like e.g. a reversal point on the valve plate side.

If this anticipated reversal point on the valve plate side is too close to the valve plate, then the movement can still be promptly corrected by the influence of the target coil current, and a collision of the compressor piston with the valve plate can be prevented.

A potential future actual coil current is advantageously anticipated and the momentary target coil current is controlled by allowing for the prediction. As a result, the control anticipates the future and this reduces the probability of an uncontrolled deviation of the to-and-fro movement from the desired movement pattern. For example, an excessive coil current, which could result in damage to the drive coil, can be identified and corrected through this in advance.

In a special embodiment, the method comprises the following method steps: recording a first point in time, at which the rotor and/or the compressor piston moves past a first position during its forward movement; recording a second point in time, at which the rotor and/or the compressor piston moves past the first position during its backward movement; recording a third point in time, at which the rotor and/or the compressor piston moves past a second position, offset along the axis in respect of the first position, during its forward movement; recording a fourth point in time, at which the rotor and/or compressor piston moves past the second position, offset along the axis in respect of the first position, during its forward movement; calculating a momentary and/or future actual position of the rotor and/or of the compressor piston by means of interpolation or extrapolation from the points in time; comparing the calculated actual positions with the predetermined target movement curve; and activating the rotor and/or the compressor piston according to the comparison result. This type of activation can in principle also be used with other current controls, in particular also when no coil current is provided, but instead a coil voltage control.

By the use of at least two positions at which the point in time of the to-and-fro movement is recorded, an asymmetrical movement of the rotor or compressor piston, for example a sinusoidal oscillation distorted into a saw shape, can be recorded and taken into account for the control. Asymmetrical modes of oscillation substantially increase the exact determination of the position of the reversal points. A particularly narrow guidance of the actual coil current to the target coil current can be achieved in this way. For example, the points in time are recorded with the help of two light barriers.

The interpolation and/or extrapolation can be carried out with the help of approximation functions, in particular circular functions like cosine or sine functions, polynomials or splines. A logic can also be used which learns the kinesic behavior of the rotor or the compressor piston on the basis of the movement history, and can correspondingly make statements about the future kinesic behavior. With the help of the approximation functions, the position of the rotor or the compressor piston can be reconstructed, determined and/or predicted as a function of time, wherein in particular the position of the first and second reversal points as well as the times at which these are passed through can be calculated. With linear compressors, the most precise knowledge of the position of the reversal point on the valve plate side as possible is in practice particularly beneficial.

The calculation is advantageously carried out with the aid of a first approximation function, in particular a circular function with a first phase, frequency and/or amplitude, for the forward movement of the rotor or the compressor piston, and a second approximation function, in particular of a second circular function with a second phase, frequency and/or an amplitude for the movement backward of the rotor or the compressor piston.

By separate treatment of the to-and-fro movement, an asymmetrical mode of oscillation can be considered in a simple manner. Asymmetrical modes of oscillation arise in linear compressors through the linear work performed on a fluid to be compressed, since during the compression work is performed which is again not passed on to the compressor piston due to the opening of a valve of the linear compressor on the pressure connection side.

By consideration of asymmetrical approximation functions, as can sometimes be constructed for instance by assembling together a first and a second approximation function which are each symmetrical, the precision with which the actual position of the rotor or the compressor piston is determined is further increased.

Basically, further points in time at which the rotor and/or the compressor piston moves past further positions can also be recorded, and considered during the control. The use of further supporting points allows the actual position of the rotor or the compressor piston to be determined more precisely.

In an advantageous embodiment, the coil current is connected with the help of an H bridge. An H bridge is a converter switching and, as a rule, comprises four transistors which are arranged in the shape of an H. With the help of the H bridge, a current can be connected precisely. For example, with this the current can be activated or controlled with a PWM open-loop control (PWM: pulse with modification).

A drive coil can be activated with a rectangular signal, with, in particular, the temporal duty cycle lying in a range of 73% to 87%, in particular in a range of 78% to 82%. Duty cycle is understood to mean the duration of the connected status of the drive coil in respect of the whole cycle duration.

The target coil current can essentially by rectangular. Upon reversal of the direction of movement, the target coil current in particular is connected and disconnected again after travel in a range of 91% to 98%, in particular in the range of 87% to 93%. In this way, the amplitude of the target coil current is advantageously adjusted by way of two current I controllers (one for each to-and-fro movement, which corresponds in linear compressors to a compression and an expansion half-cycle) in such a way that the calculated reversal points agree with the associated target values as effectively as possible.

In a special embodiment, during a transient effect, the current amplitude of the coil current is increased in a controlled fashion, in particular monotonously, preferably linearly, with in particular a controlled operation transferring into an operation subject to closed-loop control as soon as the current amplitude and/or the oscillation amplitude of the to-and-fro movement of the rotor and/or the compressor piston exceeds a predetermined value.

In this way adjustments are carried out in particular initially on a first reversal point and subsequently on a second reversal point of the to-and-fro movement. A controlled separated treatment of the reversal point ensures a particularly high degree of reliability upon transfer from the open-loop to closed-loop controlled operation.

A start-up behavior of this type allows the movement of the rotor or the compressor piston to be reliably passed onto the stationary closed-loop controlled operation.

The device according to the invention, comprising a linear drive which has a stator, a rotor which is capable of moving to and fro along a drive axis therein, a drive coil through which coil current flows through it and a means for closed-loop control of a coil current, in particular for a linear compressor which has a piston housing and a compressor piston which is capable of moving to and from along a piston axis therein and is driven by the linear drive, provides that the coil current is controllable with the means for closed-loop control of the coil current in such a way that the actual coil current and the target coil current are essentially the same.

This kind of closed-loop control allows for a high positioning precision of the rotor or of the compressor, even if network fluctuations influence the operating voltage, and so renders possible a particularly controlled movement of the rotor or the compressor piston. This enables a linear compressor to be driven with a higher degree of efficiency and thus in a more energy-saving fashion than was previously known.

Advantageously, the means for closed-loop control of the coil current has at least one of the following characteristics ($\beta1$ to $\beta4$): ($\beta1$) a means for predicting a future actual coil current is provided and the momentary coil current can be controlled taking into consideration the prediction; ($\beta2$) a means for determining a target coil current is provided and a target coil current can be determined as a function of a momentary and/or future actual position of the rotor or of the compressor piston; ($\beta3$) a means is provided for predicting a future actual coil current, with which the momentary and/or future actual position of the rotor or of the compressor piston can be determined as a function of the last 2 to 20, in particular 4 to 10 oscillation periods; ($\beta4$) a means for predicting a future actual coil current is provided, with which the future actual position can be anticipated taking into consideration a trend of the to-and-fro movement of the rotor and/or compressor piston, the last 2 to 20, in particular 4 to 10 oscillation periods.

Any combinations of the characteristics ($\beta1$) to ($\beta4$) are advantageous here, with a combination of the characteristics ($\beta1$) with ($\beta2$) as well as ($\beta1$), ($\beta2$), ($\beta3$) and ($\beta1$) and ($\beta3$) nevertheless being preferred.

In a special embodiment of the invention, the device further comprises a first means for recording a first point in time, at which the rotor and/or the compressor piston moves past a first position during its forward movement, and for recording a second point in time, at which the rotor and/or the compressor piston moves past the first position during its backward movement, a second recording means for recording a third point in time, at which the rotor and/or the compressor piston moves past a second position, which is offset along the axis in respect of the first position, during its forward movement, and for recording a fourth point in time, at which the rotor and/or the compressor piston moves past a second position, which is offset along the axis in respect of the first position, during its forward movement, a means of calculating a momentary and/or future position of the rotor and/or the compressor piston by means of interpolation or extrapolation from the momentary and/or past points in time, a means of comparing the calculated positions with a predetermined movement curve and a control means for actuating the rotor and/or the compressor piston according to the comparison result.

This modification can in principle also be applied to other closed-loop controls like e.g. voltage controls, i.e. also on control modes which do not provide an equalization of the actual coil current on the target coil current.

A feedback of this type allows for two fixed armature positions inside a maximum armature hub, and the times at which the armature traverses the positions are measured. Here, a measuring position is advantageously located in the vicinity of a reversal point of the armature or piston oscillation on the work side, i.e. for example on the valve plate side of a linear compressor. The movement of the rotor or the compressor piston can be recorded or predetermined more precisely with the device, and an operation of the device with the linear drive or with the linear compressor can be embodied with a higher degree of efficiency.

With the help of this further recording means, the actual position of the rotor or the compressor piston can be recorded more exactly and the movement can be controlled; however, further recording means increase the complexity of the device as well as the control algorithm.

Advantageously, an H bridge for connecting the coil current is provided. With the help of the H bridge, even comparatively large currents of several amperes in strength can be precisely connected.

Closed-loop control advantageously provides a duty cycle in a range of 73% to 87%, in particular in a range of 78% to 82%.

It has shown that the position of the reversal point fluctuates less the larger the chosen duty cycle. The duty cycle must however be smaller than 1, as the actual coil current does not perfectly follow the target coil current in the target current and a certain time is required for oscillating on or off. This time for oscillation on or off depends on the size of the target coil current leap, the (aligned) operating voltage of the H bridge, on the inductivity and the ohmic resistance of the drive coil as well as on the control loop parameters. A temporal duty cycle of around 80% is advantageous, as here a conventional compromise between the two competing effects is found.

The calculating means can have a means for determining an average, through which a current and/or future actual position can be determined as a function of the last 2 to 20, in particular 4 to 10 oscillation periods. In this way, typical movement behavior is generated from the past oscillations, a behavior from which the oscillations in the future can be extrapolated. Here in particular the positions of the reversal points can be determined. By averaging, measuring errors during the determination of the points in time or the determination of the position of the rotor or compressor pistons can be reduced. Averaging allows a more precise prediction of the future positions of the reversal points.

The device can be a cooling unit, in particular a refrigerator or a freezer or an air-conditioning unit for a vehicle.

In further development, further recording means for recording further points in time, at which the rotor and/or the compressor piston move past a further position in a to-and-fro movement are provided.

Advantageously, at least one of the recording means for recording the points in time at which the rotor and/or the compressor piston move past a position during their forward movement is arranged in a position at between 20% and 10%, in particular between 17% and 12%, of the gap between the two reversal points in front of a reversal point. The nearer the recording means is arranged to the reversal points, the more precise the position of the reversal point can be established. If the recording means is too near to a reversal point, however, then the movement of the rotor or the compressor piston during the transient effect and the closed-loop control can no longer take hold soon enough to avert a collision. It has proven advantageous to arrange the recording means in particular at 15% of the gap between the two reversal points in front of a reversal point, in order to obtain a balance between the two aspects.

The method according to the invention for cooling goods and/or for compressing a fluid uses the device according to the invention and/or the closed-loop control method according to the invention. Because of the increased efficiency in closed-loop control of the linear drive or the linear compressor, and the accompanying increased degree of efficiency during operation, the method for cooling goods or for compressing a fluid can be carried out particularly simply and efficiently, so that the goods can be cooled to a high degree of efficiency swiftly, reliably and in an energy-saving manner, or rather the fluid can be compressed to a high degree of efficiency swiftly, reliably and in an energy-saving manner.

BRIEF DESCRIPTION OF THE DRAWINGS

Further advantageous details and specific embodiments are described in more detail with reference to the drawing below, which is not intended to restrict the invention but simply to illustrate it by way of examples and in which:

FIG. 1 shows a schematic sectional view of device according to the invention, which is embodied as a linear compressor;

FIG. 2 shows a schematic refrigerator comprising an inventive device according to FIG. 1;

FIG. 9 shows a schematic graph which depicts the temporal progression during the transient effect over time intervals.

DETAILED DESCRIPTION OF THE PRESENT INVENTION

Figure 3:
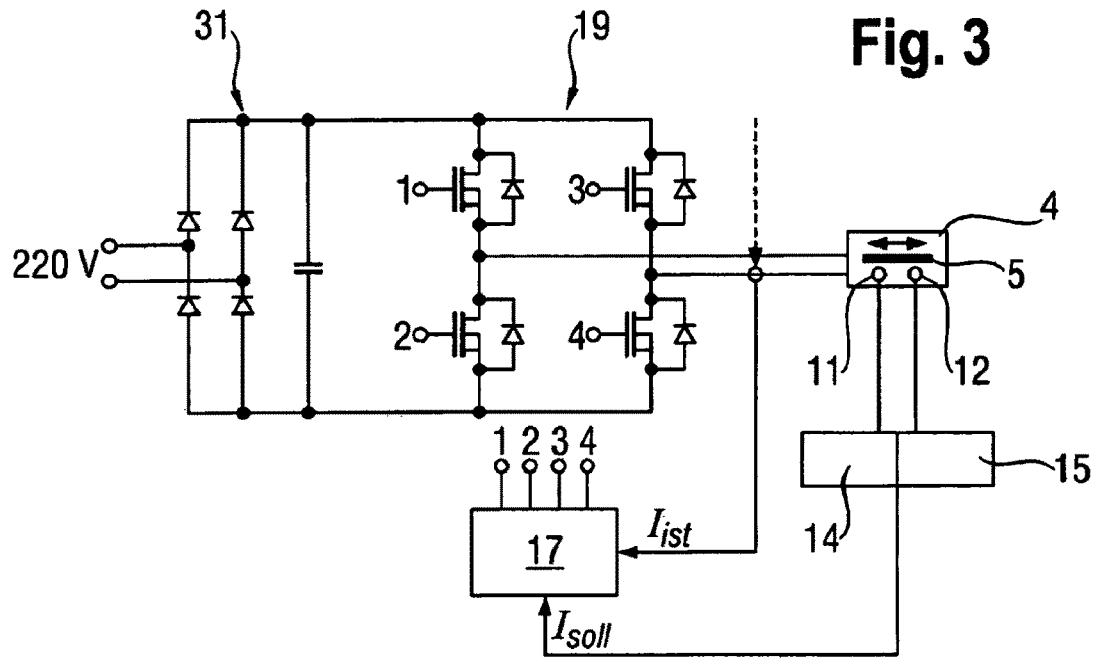
FIG. 3 shows a schematic circuit diagram for an inventive linear compressor or linear drive.

FIG. 1 shows a device 1 according to the invention in cross section with a linear drive 2 which drives a linear compressor 3 for compressing a gaseous fluid 32. The fluid 32 can be a coolant which is fed into a condensation level (not shown). The linear drive 2 comprises a stator 4, in which a rotor 5 can be moved to and fro along a drive axis 9. The rotor has magnets (not shown) which are moved with the help of a drive coil 6.

The linear drive 2 is connected via a piston rod 27 to a compressor piston 8 which can be moved to and fro along a piston axis 33 in a piston housing 7. The piston rod 27 has couplings 26 formed as narrow points, which serve to prevent the compressor piston 8 from tilting. The couplings 26 can absorb deflections acting at right angles in respect of the piston rod 27.

With the help of a housing wall 28 which has openings 29, the compressor piston 8 is mounted on the side, i.e. in a direction at right angles to the piston axis 33, by a fluid produced with the help of an inlet 30 being pushed through the openings 29. A gas cushion is formed in front of the housing wall 28 by the fluid flowing out of the openings 29, a cushion which holds the compressor piston 8 at a distance in front of the housing wall 28 and mounts it in a contact-free fashion. Overall, a gas pressure bearing is formed by this.

The actual position of the compressor piston 8, or the points in time at which the compressor piston 8 moves past a first position 11 or a second position, is ascertained with the help of a recording means 14 for recording a first and second point in time and a recording means 15 for recording a third and fourth point in time, wherein the first and the third points in time are the points in time at which the compressor piston 8 moves past the respective position 11, 12 during its forward movement, and the second and the fourth points in time are those points in time at which the compressor piston 4 moves past the particular positions 11, 12 during its backward movement. A further recording means 23 serves to ascertain the point in time at which the compressor piston 4 moves past a further position 24.

The compressor piston 8 moves to and fro between a first reversal point 21 and a second reversal point 22 in an oscillating fashion. The reversal points are located at +10 mm and at −10 mm. The recording means 14, 15 are arranged at +7 mm and at −7 mm, i.e. in each case 3 mm in front of the respective reversal point 21, 22. The drive coil 6 is controlled by a means 10 for closed-loop control of the coil current with the help of an H bridge 19, wherein the momentary target coil current is subjected to closed-loop control taking into consideration the prediction with the help of a means 13 for predicting a future actual coil current. With the help of a means 34 for determining a target coil current, a target coil current is determined as a function of a momentary and/or expected future actual position of the rotor 5 or the compressor piston 8. With the help of the means 13 for predicting a future actual coil current, the present and/or future actual position of the rotor 5 or the compressor piston 8 is determined as a function of the last 5 oscillation periods. With the help of a calculating means 16 for calculating a momentary and/or future position of the rotor 5 and/or the compressor piston 8, the present and/or future position of the rotor 5 and/or of the compressor piston is ascertained by means of interpolation or extrapolation from the current and/or past points in time. A comparison means 17 compares calculated actual positions with a predetermined (target) movement curve. The predetermined movement curve in particular simulates the maximum reversal points 21, 22 of the rotor 5 or the compressor piston 8, in order to avoid a collision of the compressor piston 8 with a valve plate (not shown). A control means 18 activates the rotor 5 and/or the compressor piston 8 according to the comparison result.

FIG. 2 shows a cooling unit 20 for use of the device according to the invention 2 for cooling goods 25. The high degree of precision in closed-loop control of the to-and-fro movement of rotor 5 or compressor piston 8 allows a dead volume in a linear compressor 3 to be substantially reduced, as a result of which the degree of efficiency of the cooling unit 20 can be substantially increased. As a result, goods 25 can be cooled efficiently, in an energy-saving manner, reliably and easily.

FIG. 3 shows a schematic circuit diagram of a device 1 according to the invention with a rectifier 21, an H bridge 19, the comparison means 17, the recording means 14 for recording the first and second points in time, the recording means 15 for recording the third and fourth points in time at which the rotor 5 in the stator 4 moves past a first position 11 and a second position 12 during its to-and-fro movement.

Figure 4:
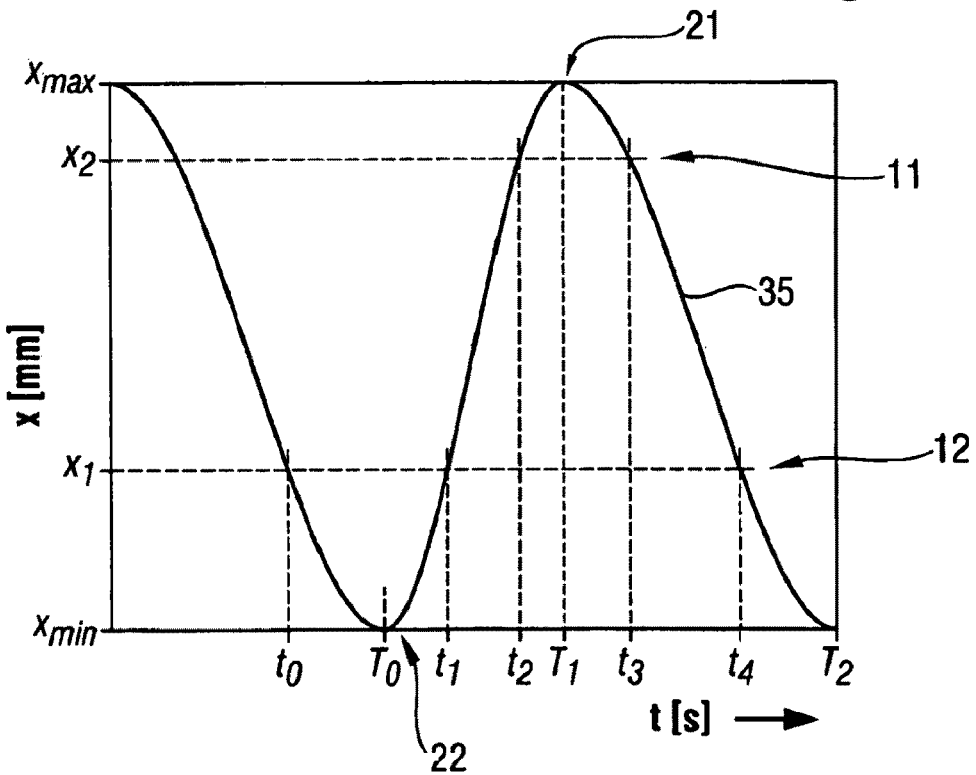
FIG. 4 shows a schematic one and a half oscillation periods of a to-and-fro movement of a rotor and/or of a compressor piston.

FIG. 4 shows one and a half oscillation periods of an actual position 35 of a compressor piston 8 during the to-and-fro movement and shows the variables used below. The actual armature is recorded using measuring technology, this measurement result is conveyed to a position regulator, the position regulator generates a target current signal (target current through the generator coil of the linear drive—labeled $I_{soll}$ in the diagram) which is implemented by means of a (PWM-open-loop-controlled) control loop in combination with an H bridge (converter circuit) as the final control element (i.e. actual current $I_{ist}$ and target current $I_{soll}$ are approximately the same). The armature position measurement positions are labeled $x_1$ and $x_2$, the measuring points in time $t_0$ to $t_4$, the armature position values in the lower and upper reversal points $x_{min}$ and $x_{max}$. The armature reaches the lower or upper reversal points at times $T_0$ to $T_2$.

Within the control algorithm, the armature position should be described as a function of time, x(t), approximately for the compression and expansion half-cycle in each case by a cosine half cycle.

Compression Half Cycle:

$$x(t) = -\frac{(x_{max} - x_{min})}{2} \cdot \cos\left(\frac{\pi}{(T_1 - T_0)}(t - T_0)\right) + \frac{(x_{max} + x_{min})}{2} \text{ for } T_0 \le t \le T_1 \quad \text{Eq. 1}$$

Expansion Half Cycle:

$$x(t) = \frac{(x_{max} - x_{min})}{2} \cdot \cos\left(\frac{\pi}{(T_2 - T_1)}(t - T_1)\right) + \frac{(x_{max} + x_{min})}{2} \text{ for } T_1 \le t \le T_2 \quad \text{Eq. 2}$$

Taking as a basis the ratio $(t_1-T_0)/(T_0-t_0)=(t_2-t_1)/(t_4-t_3)$, the following is obtained for the locations of the reversal points, $$x_{min} = \frac{x_1 - x_2 + x_1 \cdot \cos\left(\frac{\pi \cdot (t_3 - t_2)}{t_4 - t_0}\right) - x_2 \cdot \cos\left(\frac{\pi \cdot (t_4 - t_1)}{t_4 - t_0}\right)}{\cos\left(\frac{\pi \cdot (t_3 - t_2)}{t_4 - t_0}\right) - \cos\left(\frac{\pi \cdot (t_4 - t_1)}{t_4 - t_0}\right)} \quad \text{Eq. 11}$$

$$x_{max} = \frac{x_2 - x_1 + x_1 \cdot \cos\left(\frac{\pi \cdot (t_3 - t_2)}{t_4 - t_0}\right) - x_2 \cdot \cos\left(\frac{\pi \cdot (t_4 - t_1)}{t_4 - t_0}\right)}{\cos\left(\frac{\pi \cdot (t_3 - t_2)}{t_4 - t_0}\right) - \cos\left(\frac{\pi \cdot (t_4 - t_1)}{t_4 - t_0}\right)}. \quad \text{Eq. 12}$$

$x_1=-7.0$ mm and $x_2=+7.0$ mm were chosen as measuring positions. The target values for the maximum armature position $x_{max}$ (=upper reversal point) and the minimum armature position $x_{min}$ (=lower reversal point) were given as $L_{max}=+9.8$ mm and $L_{min}=-9.7$ mm.

Figure 5:
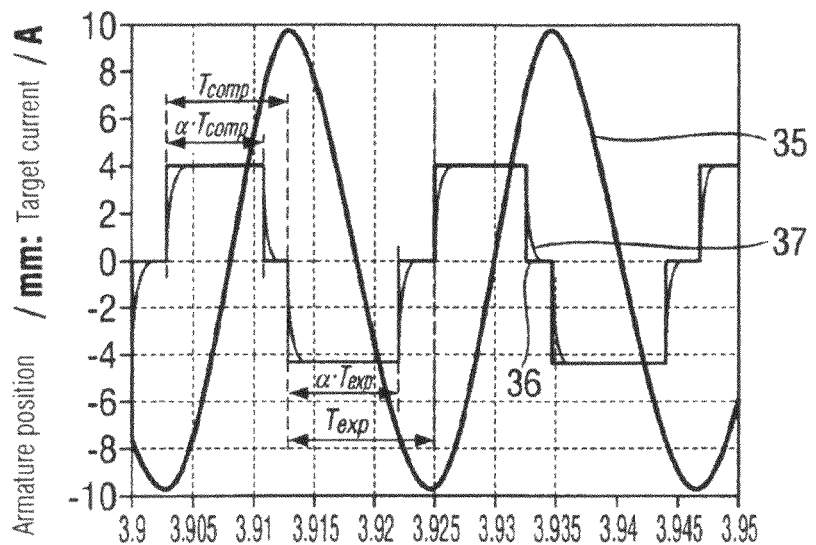
FIG. 5 shows a schematic graph in which the temporal progression of the actual position of a rotor or of a compressor piston, of the actual coil current or of the target coil current in a steady state is shown.

In FIG. 5, the simulated actual position 35, i.e. the armature position, the target coil current 36 and the "idealized" actual coil current 37, is applied as a function of time. The actual coil current is shown "idealized", because the higher-frequency fluctuations of the actual coil current due to the pulse amplitude modulation used in the real current control loop are contained in the image. The (idealized) actual coil current 37 is simulated, or rather calculated, from the target coil current 36, as it was assumed that the current control loop is a simple PI controller. In real experiments it was observed that in armature oscillation subjected to closed-loop control the upper reversal point fluctuated more the larger the duty cycle a that was chosen. The duty cycle must, however, be less than 1, for it can be observed that the actual coil current 37 does not perfectly follow the target coil current 36 in a target current leap, but rather requires a certain period of time for oscillating in and out. This oscillating in and out depends on the size of the target current leap, the (rectified) operating voltage of the H bridge, on the inductivity and ohmic resistance of the drive coil as well as on the current control loop parameters. A (temporal) duty cycle a of 80%, as was used in FIG. 5, has proven to be particularly advantageous, in that as a rule the requirement described was "easily, but not too easily" sufficient.

Figure 6:
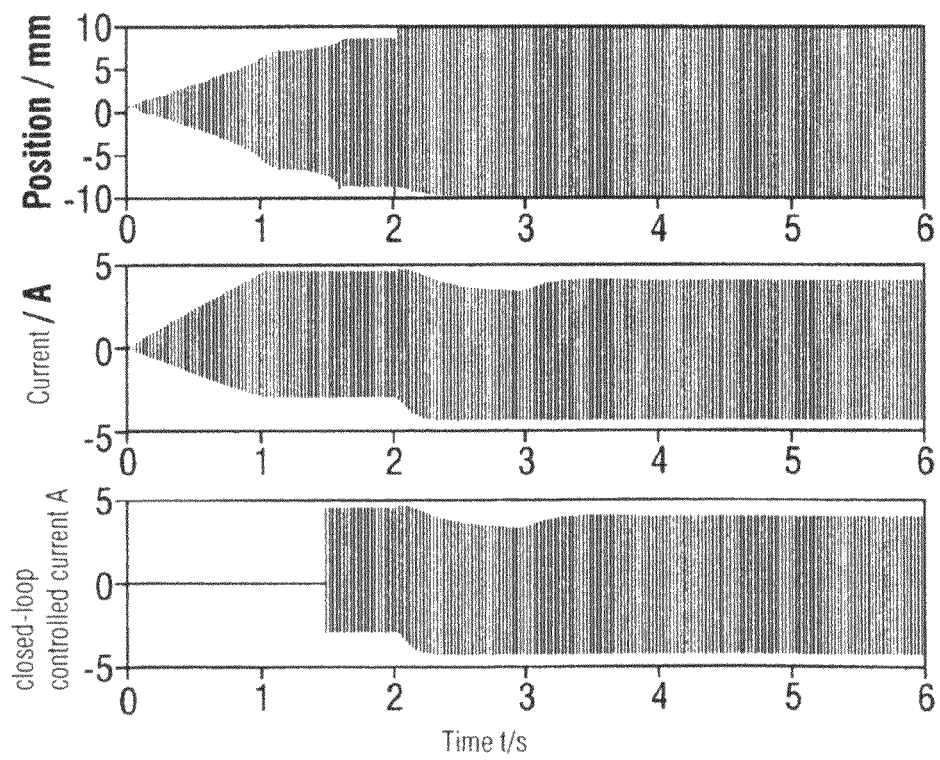
FIG. 6 shows a schematic graph in which a simulated temporal progression of the actual position of a rotor or of a compressor piston, of the closed-loop and the not-closed-loop (i.e. open-loop) controlled coil current during the transient effect is shown.

FIG. 6 shows a simulated transient effect. Here, in the upper diagram the armature position is plotted over time, and therebelow the coil current as well as the so-called coil current subject to so-called closed-loop control over time. (Here, a distinction is made between closed-loop coil current and not-closed-loop, i.e. open-loop, controlled coil current, which will be explained in detail below).

During the first 2 seconds, the current is subject not to closed-loop, but to open-loop, control. Here, during the first seconds the amplitudes of the rectangular target current signal are increased linearly over time, until a positive current amplitude value of +4.5 A and a negative current amplitude value of −3.0 A is achieved. With the increasing coil current, the amplitude of the armature oscillation increases.

For 1.0 s<t<2.0 s the (open-loop controlled) current amplitude remains constant. In this, the amplitude of the armature oscillation increases further (if not quite as strongly as previously) up to approx. t=1.6 s. At approx. t=1.4 s, the armature oscillation amplitude is so large that both measuring positions $x_1$ and $x_2$ are crossed over by the armature.

For t>1.6 s, the armature oscillation during controlled operation is in a stationary state, and both measuring positions $x_1$ and $x_2$ are crossed over by armatures. Hence the requirements for switching over to an operation subject to closed-loop control are given. At t=2.0 s a switch is made to operation subject to closed-loop control. In this, the positive and negative current amplitude values (of +4.5 A and −3.0 A)

are initially taken over by the operation subject to open-loop control. A simple "phase adaptation" of the current signal to the armature oscillation is carried out, so that the current signal is always acting in the direction of the armature movement, i.e. not electrically halted. This can result in the armature oscillation amplitude increasing very quickly after switching over from open-loop to closed-loop controlled operation. In FIG. 6, this is primarily the case in the vicinity of the upper reversal point. In order to prevent a collision of the piston with the valve plate, for 2.0 s<t<3.0 s the target value for $x_{max}$ is not immediately set to the end value for $L_{max}=+9.8$ mm, but at +9.5 mm. For the target value of $x_{min}$, however, the value of $L_{min}=-9.7$ mm applies immediately from connection of the closed-loop control (at t=2.0 s). From t=3.0 s the target value for $x_{max}$ is set to the end value of $L_{max}=+9.8$ mm. Transient operation subject to closed-loop control is achieved from approx. t=4.0 s.

Figure 7:
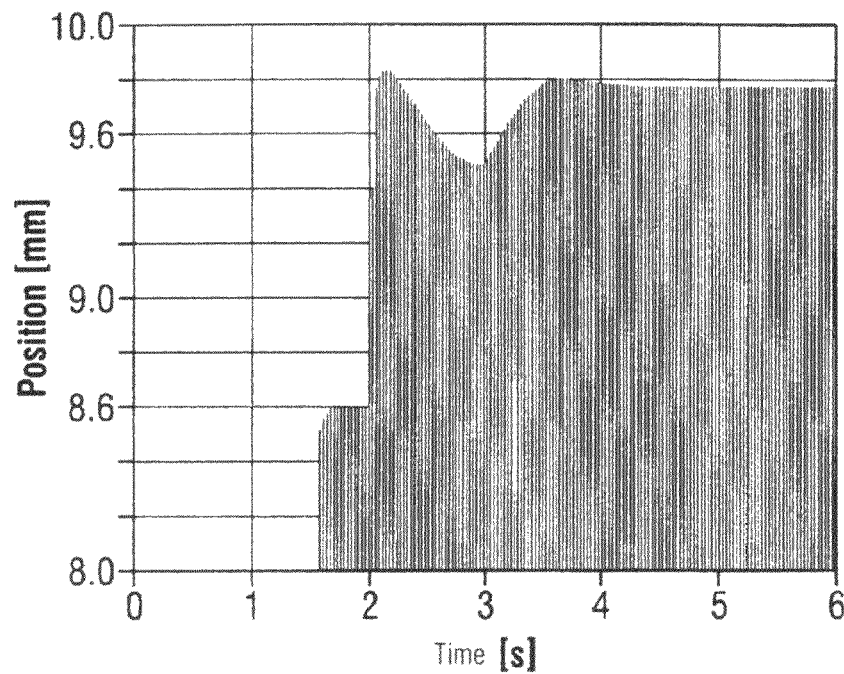
FIG. 7 shows a schematic graph which depicts the temporal progression of the actual position according to FIG. 6 on the upper reversal point during the transient effect in more detail.
Figure 8:
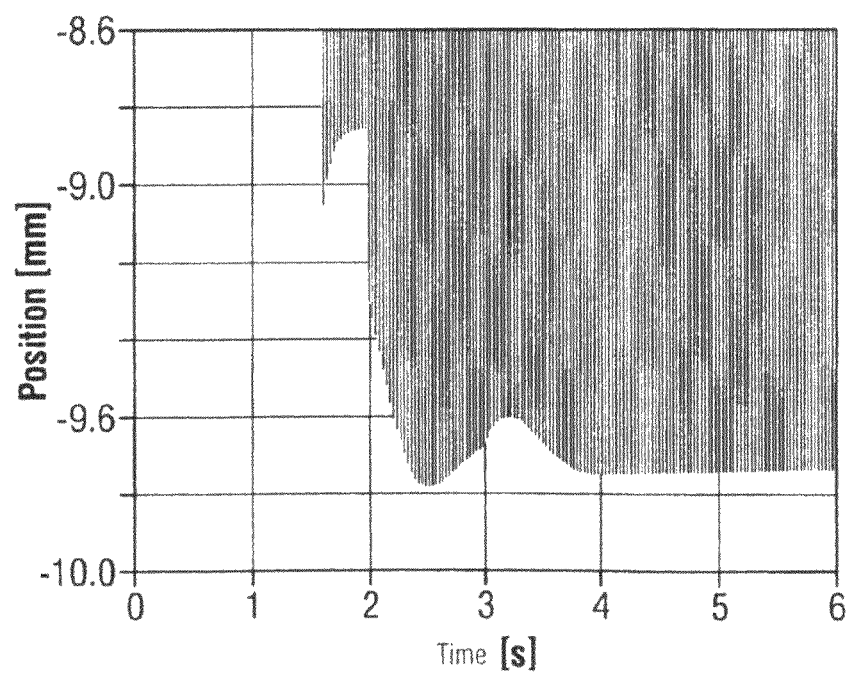
FIG. 8 shows a schematic graph which depicts the temporal progression of the actual position according to FIG. 6 on the lower reversal point during the transient effect in more detail.

FIGS. 7 and 8 depict the temporal progressions of the actual position on the upper and lower reversal points during the transient effect. FIG. 9 show the temporal progression at time intervals.

As is apparent from FIGS. 7 to 9, in the transient state (for t>4.0 s), the target values of $L_{max}=+9.8$ mm and $L_{min}=-9.7$ mm are slightly off the mark. This is due to the fact that approximation by means of two cosine functions is not ideal and therefore the reversal points calculated by means of Eq. 11 and Eq. 12 are different to the actual ones. These discrepancies, which are caused by the choice of the approximation function, can be made as small as is desired, however, in that approximation functions with more "tuning parameters" or fit parameters are used.

The switchover process from open-loop to closed-loop operation at t=2 s is depicted in FIG. 9 with a high time interval. The actual position 35, i.e. the simulated actual armature, is sinusoidal and the target current 36 is rectangular. Upon switchover at t=2.0 s—with an initially constant positive and negative amplitude of the rectangular target current signal—the target current signal with the armature oscillation is brought "in phase", i.e. the electromagnetic force emanating from current always acts on the armature, from the point in time of the switchover, in the direction of the (natural) armature movement. This was not previously the case during operation subject to open-loop control, as is apparent from the figure. Next, the two target current amplitude values are gradually altered in such a way (by two current controllers) that the upper and the lower reversal points of the armature oscillation approach their respective target values.

The invention relates to a method for closed-loop control of a linear drive 2 which has a stator 4, a rotor 5 which is capable of moving to and fro along a drive axis 9 therein, and a drive coil 6 through which a coil current flows, in particular for a linear compressor which has a piston housing 7 and a compressor piston 8 which can be moved to and fro along a piston axis 33 therein and is driven by the linear compressor 2, with the coil current being subject to closed-loop control such that the actual coil current and the target coil current are essentially the same; as well as to a device (1) suitable for carrying out the method according to the invention and a method for cooling goods 25 and/or for compressing a fluid 32 which uses the device 1 or the closed-loop control method according to the invention. The invention is characterized in that the closed-loop control of the to-and-fro movement of the rotor 5 or the compressor piston 8 can be efficiently and precisely monitored with simple means, without an expensive sensor system being required.

LIST OF LABELS

1 Device
2 Linear drive
3 Linear compressor
4 Stator
5 Rotor
6 Coil
7 Piston housing
8 Compressor piston
9 Drive axis
10 Means for closed-loop control of the coil current
11 First position
12 Second position
13 Means for predicting a future coil current
14 Recording means for recording a first and second point in time
15 Recording means for recording a third and fourth point in time
16 Calculation means
17 Comparison means
18 Control means
19 H bridge
20 Cooling unit
21 First reversal point
22 Second reversal point
23 Further recording means
24 Further position
25 Goods
26 Connection
27 Piston rod
28 Housing wall
29 Openings
30 Inlet
31 Rectifier
32 Fluid
33 Piston axis
34 Means for determining a target coil current
35 Simulated actual position
36 Target coil current
37 Actual coil current

The invention claimed is:

1. A method for closed-loop control of a linear drive including a stator, a rotor configured for reciprocating movement along a drive axis therein, and a drive coil through which coil current flows, in particular for a linear compressor including a piston housing and a compressor piston configured for reciprocating movement along a piston axis therein, and driven by the linear drive wherein the coil current is subject to closed-loop control, the method comprising the steps of determining a target coil current and applying an actual coil current wherein the actual coil current and the target coil current are substantially the same value, wherein the step of determining a target coil current includes determining a target coil current as a function of at least one of a momentary actual position and a future actual position of at least one of the rotor and the compressor piston.

2. The method according to claim 1 wherein the step of determining a target coil current includes determining a target coil current as a function of at least one of a momentary actual position and a future actual position of at least one of the rotor and the compressor piston as a function of the last about 2 to about 20 oscillation periods.

3. The method according to claim 2 wherein the step of determining a target coil current includes determining a target coil current as a function of at least one of a momentary actual position and a future actual position of at least one of the rotor and the compressor piston wherein the future actual position is anticipated based on a trend of the reciprocating movement over about the last about 2 to about 20 oscillation periods.

4. The method according to claim 3 wherein the step of determining a target coil current includes determining a target coil current as a function of at least one of a momentary actual position and a future actual position of at least one of the rotor and the compressor piston wherein the future actual position is anticipated based on a trend of the reciprocating movement over about the last about 4 to about 10 oscillation periods.

5. The method according to claim 2 wherein the step of determining a target coil current includes determining a target coil current as a function of at least one of a momentary actual position and a future actual position of at least one of the rotor and the compressor piston as a function of the last about 4 to about 10 oscillation periods.

6. The method according to claim 1 and further comprising the steps of:
recording a first point in time at which at least one of the rotor and the compressor piston moves past a first position during its forward movement,
recording a second point in time at which at least one of the rotor and the compressor piston moves past the first position during its backward movement,
recording a third point in time at which at least one of the rotor and the compressor piston moves past a second position offset along the axis in respect of the first position during its forward movement,
recording a fourth point in time at which at least one of the rotor and the compressor piston moves past a second position offset along the axis in respect of the first position during the backward movement,
calculating at least one of a momentary actual position and future actual position of at least one of the rotor and the compressor piston using at least one of interpolation and extrapolation from the recorded points in time,
comparing the calculated actual position with a predetermined target movement curve, and
activating at least one of the rotor and the compressor piston according to the comparison result.

7. The method according to claim 6 wherein the step of at least one of interpolation and extrapolation is carried out with the help of approximation functions, in particular circular functions like cosine or sine functions, polynomials or splines.

8. The method according to claim 7 wherein the step of calculating using at least one of interpolation and extrapolation is carried out with the help of a first approximation function, in particular a first circular function with at least one of a first phase, frequency and amplitude, for the forward movement of at least one of the rotor and the compressor piston; and a second approximation function, in particular a second circular function with at least one of a second phase, frequency and amplitude, for the backward movement of the rotor or the compressor piston.

9. The method according to claim 6 and further comprising the step of recording further points in time at which at least one of the rotor and the compressor piston moves past further positions, and is taken into consideration in closed-loop control.

10. The method according to claim 1 wherein the coil current is connected with the help of an H bridge.

11. A method for at least one of cooling goods and for compressing a fluid comprising the method according to claim 1; and operating the device.

12. A method for closed-loop control of a linear drive including a stator, a rotor configured for reciprocating movement along a drive axis therein, and a drive coil through which coil current flows, in particular for a linear compressor including a piston housing and a compressor piston configured for reciprocating movement along a piston axis therein, and driven by the linear drive wherein the coil current is subject to closed-loop control, the method comprising the steps of determining a target coil current and applying an actual coil current wherein the actual coil current and the target coil current are substantially the same value,
wherein the step of determining a target coil current includes predicting a potential future actual coil current and the momentary target current subject to closed-loop control, using the predicted future actual coil current.

13. A method for at least one of cooling goods and for compressing a fluid comprising the method according to claim 12; and operating the device.

14. A method for closed-loop control of a linear drive including a stator, a rotor configured for reciprocating movement along a drive axis therein, and a drive coil through which coil current flows, in particular for a linear compressor including a piston housing and a compressor piston configured for reciprocating movement along a piston axis therein, and driven by the linear drive wherein the coil current is subject to closed-loop control, the method comprising the steps of determining a target coil current and applying an actual coil current wherein the actual coil current and the target coil current are substantially the same value, and activating the drive coil with a rectangular signal, wherein the temporal duty cycle lies in a range of about 73% to about 87%.

15. The method according to claim 14 wherein the temporal duty cycle lies in a range of about 78% to about 82%.

16. A method for closed-loop control of a linear drive including a stator, a rotor configured for reciprocating movement along a drive axis therein, and a drive coil through which coil current flows, in particular for a linear compressor including a piston housing and a compressor piston configured for reciprocating movement along a piston axis therein, and driven by the linear drive wherein the coil current is subject to closed-loop control, the method comprising the steps of determining a target coil current and applying an actual coil current wherein the actual coil current and the target coil current are substantially the same value, and further comprising the step of subjecting, during a transient effect, the current amplitude of the coil current to open-loop control, in particular increased monotonously, preferably linearly, wherein in particular an operation subject to open-loop control becomes an operation subject to closed-loop control when at least one of the current amplitude and the oscillation amplitude of the reciprocating movement of at least one of the rotor and the compressor piston exceeds a predetermined value, wherein in particular adjustment is carried out initially at a first reversal point and subsequently at a second reversal point of the reciprocating movement.

17. A method for at least one of cooling goods and for compressing a fluid comprising the method according to claim 16; and operating the device.

18. A device comprising a linear drive which has a stator, a rotor which is capable of reciprocating movement along a drive axis therein, a drive coil for coil current flow therethrough and means for closed-loop control of a coil current, in particular for a linear compressor which has the linear drive, a piston housing and a compressor piston configured for reciprocating movement along a piston axis therein and drivable by the linear drive, the device comprising means for closed-loop control of the coil current configured for subjecting the coil to closed-loop control in a manner wherein the actual coil current and the target coil current are substantially the same value, wherein the means for closed-loop control of the coil current includes at least one of the following elements:

means for predicting a future actual coil current wherein the momentary target coil current can be subject to closed-loop control, using the predicted future actual coil current;

means for determining a target coil current as a function of at least one of a momentary and future actual position of at least one of the rotor and the compressor piston;

means for predicting a future actual coil current with which at least one of the momentary and future actual position of at least one of the rotor and the compressor piston can be determined as a function of the last about 2 to about 20, in particular about 4 to about 10, oscillation periods;

means for predicting a future actual coil current with which the future actual position can be anticipated taking into consideration a trend in the reciprocating movement of at least one of the rotor and the compressor piston over the last about 2 to about 20, in particular about 4 to about 10, oscillation periods.

19. The device according to claim 18 and further comprising an H bridge for connecting the coil current.

20. The device according to claim 18 wherein the device includes a cooling unit, in particular at least one of a refrigerator, a freezer and an air-conditioning system.

21. A device comprising a linear drive which has a stator, a rotor which is capable of reciprocating movement along a drive axis therein, a drive coil for coil current flow therethrough and means for closed-loop control of a coil current, in particular for a linear compressor which has the linear drive, a piston housing and a compressor piston configured for reciprocating movement along a piston axis therein and drivable by the linear drive, the device comprising means for closed-loop control of the coil current configured for subjecting the coil to closed-loop control in a manner wherein the actual coil current and the target coil current are substantially the same value;

first recording means for recording a first point in time wherein at least one of the rotor and the compressor piston moves past a first position during its forward movement, and in order to record a second point in time wherein at least one of the rotor and the compressor piston moves past the first position during the backward movement;

second recording means for recording a third point in time, wherein at least one of the rotor and the compressor piston moves past a second position displaced along the axis from the first position during its forward movement, and in order to record a fourth point in time wherein at least one of the rotor and the compressor piston moves past the second position offset along the axis in respect of the first position during its forward movement;

calculation means for calculating at least one of a momentary and future position of at least one of the rotor and the compressor piston using at least one of interpolation and extrapolation from at least one of the current and past points in time;

means for comparing the calculated position with a predetermined movement curve; and control means for activating at least one of the rotor and the compressor piston according to the comparison result.

22. The device according to claim 21 and further comprising a third recording means for recording further points in time wherein at least one of the rotor and the compressor piston moves past a further position during its reciprocating movement.

23. The device according to claim 21 wherein at least one of the first and the second position is located generally adjacent the reversal points of the reciprocating movement, in particular in a range of about 73% to about 87% of the amplitude of the reciprocating movement.

24. The device according to claim 23 wherein at least one of the first and the second position is located generally adjacent the reversal points of the reciprocating movement, in particular in a range of about 78% to about 82% of the amplitude of the reciprocating movement.

25. The device according to claim 21 wherein the calculation means for calculating includes an averaging means for determining a future actual position as a function of the last about 2 to about 20 oscillation periods.

26. The device according to claim 25 wherein the calculation means for calculating includes an averaging means for determining a future actual position as a function of the last about 4 to about 10 oscillation periods.

27. The device according to claim 21 wherein at least one of the recording means for recording the points in time at which at least one of the rotor and the compressor piston moves past a position during its forward movement, is disposed at a position between about 20% and about 10% of the distance between the reversal points in front of a reversal point.

28. The device according to claim 27 wherein at least one of the recording means for recording the points in time at which at least one of the rotor and the compressor piston moves past a position during its forward movement, is disposed at a position between about 17% and about 12% of the distance between the reversal points in front of a reversal point.

29. A device comprising a linear drive which has a stator, a rotor which is capable of reciprocating movement along a drive axis therein, a drive coil for coil current flow therethrough and means for closed-loop control of a coil current, in particular for a linear compressor which has the linear drive, a piston housing and a compressor piston configured for reciprocating movement along a piston axis therein and drivable by the linear drive, the device comprising means for closed-loop control of the coil current configured for subjecting the coil to closed-loop control in a manner wherein the actual coil current and the target coil current are substantially the same value, wherein closed-loop control of a temporal duty cycle is provided in a range from about 73% to about 87%.

30. The method according to claim 29 wherein closed-loop control of a temporal duty cycle is provided in a range from about 78% to about 82%.

* * * * *